US012643995B2

(12) United States Patent
de Vargas et al.

(10) Patent No.: US 12,643,995 B2
(45) Date of Patent: Jun. 2, 2026

(54) POLYETHYLENE-BASED COMPOSITION AND BIAXIALLY ORIENTED POLYETHYLENE-BASED ARTICLES

(71) Applicant: Braskem S.A., Camaçari (BR)

(72) Inventors: Daiane Schilling de Vargas, São Paulo (BR); Carlos Augusto Maia Faria, São Paulo (BR); Francisco Carlos Ruiz, São Paulo (BR); Mariele Kaipers Stocker, São Paulo (BR); Adilton Lopes da Silva, São Paulo (BR); Marcelo Jorge Aguiar Martins, São Paulo (BR); Manoela Ellwanger Cangussu, São Paulo (BR)

(73) Assignee: Braskem S.A., Camaçari (BR)

( * ) Notice: Subject to any disclaimer, the term of this patent is extended or adjusted under 35 U.S.C. 154(b) by 704 days.

(21) Appl. No.: 17/941,649

(22) Filed: Sep. 9, 2022

(65) Prior Publication Data

US 2023/0092207 A1 Mar. 23, 2023

Related U.S. Application Data

(60) Provisional application No. 63/389,315, filed on Jul. 14, 2022, provisional application No. 63/242,974, filed on Sep. 10, 2021.

(51) Int. Cl.
*C08L 23/06* (2006.01)
*C08J 5/18* (2006.01)

(52) U.S. Cl.
CPC .................. *C08L 23/06* (2013.01); *C08J 5/18* (2013.01); *C08J 2323/06* (2013.01);
(Continued)

(58) Field of Classification Search
CPC ............... C08L 23/06; C08L 2207/062; C08L 2207/064; C08L 2207/066; C08L 2203/16;
(Continued)

(56) References Cited

U.S. PATENT DOCUMENTS

2008/0300370 A1* 12/2008 Lynch ..................... C08F 10/02
526/65
2015/0344681 A1* 12/2015 Kapur ..................... C08L 23/06
525/240

(Continued)

FOREIGN PATENT DOCUMENTS

EP 4269481 A2 11/2023
WO 2014106052 A1 7/2014
(Continued)

OTHER PUBLICATIONS

International Search Report issued in corresponding International Application No. PCT/IB2022/020065 mailed Dec. 1, 2022 (6 pages).
(Continued)

*Primary Examiner* — Alicia Bland
(74) *Attorney, Agent, or Firm* — Osha Bergman Watanabe & Burton LLP

(57) ABSTRACT

A polyethylene-based composition may include an ethylene-based copolymer produced from ethylene and one or more C3-C10 alpha olefin comonomers, wherein the ethylene-based copolymer has: a density ranging from 945 kg/m$^3$ to 961 kg/m$^3$ according to ASTM D792, a melt flow rate (MFR$_2$) ranging from 0.5 g/10 min to 3.0 g/10 min according to ASTM D1238 at 190° C./2.16 kg, a molecular weight distribution (Mw/Mn) ranging from 3 to 25, and a stress exponent (SEx) ranging from 1.0 to 1.8.

37 Claims, 13 Drawing Sheets

(52) U.S. Cl.
CPC ... *C08L 2207/062* (2013.01); *C08L 2207/064* (2013.01); *C08L 2207/066* (2013.01)

(58) Field of Classification Search
CPC ..... C08L 23/0815; C08J 5/18; C08J 2323/06; B32B 2250/242; B32B 2250/40; B32B 2270/00; B32B 2307/406; B32B 2307/518; B32B 2307/536; B32B 2307/54; B32B 2307/732; B32B 27/08; B32B 27/32; B32B 27/327; C08F 10/02
See application file for complete search history.

(56) References Cited

U.S. PATENT DOCUMENTS

2016/0083539 A1 * 3/2016 Wang ..................... B32B 27/08
525/240

2021/0213721 A1 * 7/2021 Wang ........................ B32B 7/03
2021/0403657 A1 * 12/2021 Das Kumar .......... C08F 210/08
2023/0235106 A1 * 7/2023 Fereydoon ............ C08F 210/16

FOREIGN PATENT DOCUMENTS

| WO | WO-2020001191 A1 * | 1/2020 | .............. B32B 1/00 |
| WO | 2020109289 A1 | 6/2020 | |
| WO | 2021079255 A1 | 4/2021 | |
| WO | WO-2022003499 A2 * | 1/2022 | ........... C08F 210/16 |

OTHER PUBLICATIONS

Written Opinion issued in corresponding International Application No. PCT/IB2022/020065, mailed Dec. 1, 2022 (9 pages).
Office Action issued in related European Application No. 22798368.1 dated Nov. 3, 2025 (6 pages).
Office Action issued in related Argentine Application No. 20220102466 dated Oct. 27, 2025 (5 pages).

* cited by examiner

POLYETHYLENE-BASED COMPOSITION AND BIAXIALLY ORIENTED POLYETHYLENE-BASED ARTICLES

BACKGROUND

Polymeric films are widely used, both in industrial manufacturing processes and in the non-industrial sector for the delivery of goods to the consumer market. The non-industrial (or consumer) sector includes, for example, household disposables, trash bags and liners, overwrap films and bags for laundry and dry cleaning goods, shipping and carryout bags for retail merchandising of non-perishable goods, and food packaging. Depending on the properties desired the films may be formed from polypropylene, polyvinylchloride, polyethylene, and polyethylene terephthalate. Multilayer constructions are commonly used to achieve the desired properties. However, there has been a growing demand for biaxially oriented polyethylene films, largely generally due to the desire to have a fully recyclable polyethylene film.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a polyethylene-based composition that includes an ethylene-based copolymer produced from ethylene and one or more C3-C10 alpha olefin comonomers, wherein the ethylene-based copolymer has: a density ranging from 945 kg/m³ to 961 kg/m³ according to ASTM D792, a melt flow rate (MFR₂) ranging from 0.5 g/10 min to 3.0 g/10 min according to ASTM D1238 at 190° C./2.16 kg, a molecular weight distribution (Mw/Mn) ranging from 3 to 25, and a stress exponent (SEx) ranging from 1.0 to 1.8.

In another aspect, embodiments disclosed herein relate to an article comprising a polyethylene-based composition that includes an ethylene-based copolymer produced from ethylene and one or more C3-C10 alpha olefin comonomers, wherein the ethylene-based copolymer has: a density ranging from 945 kg/m³ to 961 kg/m³ according to ASTM D792, a melt flow rate (MFR₂) ranging from 0.5 g/10 min to 3.0 g/10 min according to ASTM D1238 at 190° C./2.16 kg, a molecular weight distribution (Mw/Mn) ranging from 3 to 25, and a stress exponent (SEx) ranging from 1.0 to 1.8.

In another aspect, embodiments disclosed herein relate to biaxially oriented film comprising a polyethylene-based composition that includes an ethylene-based copolymer produced from ethylene and one or more C3-C10 alpha olefin comonomers, wherein the ethylene-based copolymer has: a density ranging from 945 kg/m³ to 961 kg/m³ according to ASTM D792, a melt flow rate (MFR₂) ranging from 0.5 g/10 min to 3.0 g/10 min according to ASTM D1238 at 190° C./2.16 kg, a molecular weight distribution (Mw/Mn) ranging from 3 to 25, and a stress exponent (SEx) ranging from 1.0 to 1.8.

In another aspect, embodiments disclosed herein relate to a biaxially oriented film that includes a polyethylene-based composition, comprising: an ethylene-based polymer produced from ethylene and optionally, one or more C3-C10 alpha olefin monomers, wherein the ethylene-based polymer has: a density ranging from 940 kg/m³ to 961 kg/m³, according to ASTM D792, a melt flow rate (MFR₂) ranging from 0.5 g/10 min to 3.0 g/10 min according to ASTM D1238 at 190° C./2.16 kg, a molecular weight distribution (Mw/Mn) ranging from 3 to 25, and a stress exponent (SEx) ranging from 1.0 to 1.8.

In yet another aspect, embodiments disclosed herein relate to method of forming a biaxially oriented film that includes extruding at least one layer of a polyethylene-based composition to form a film, and biaxially stretching the film to form a biaxially oriented multilayer film, where the polyethylene-based composition incudes an ethylene-based polymer produced from ethylene and optionally, one or more C3-C10 alpha olefin comonomers, wherein the ethylene-based polymer has: a density ranging from 940 kg/m³ to 961 kg/m³, according to ASTM D792, a melt flow rate (MFR₂) ranging from 0.5 g/10 min to 3.0 g/10 min according to ASTM D1238 at 190° C./2.16 kg, a molecular weight distribution (Mw/Mn) ranging from 3 to 25, and a stress exponent (SEx) ranging from 1.0 to 1.8.

Other aspects and advantages of the claimed subject matter will be apparent from the following description and the appended claims.

DETAILED DESCRIPTION

Figure 1:
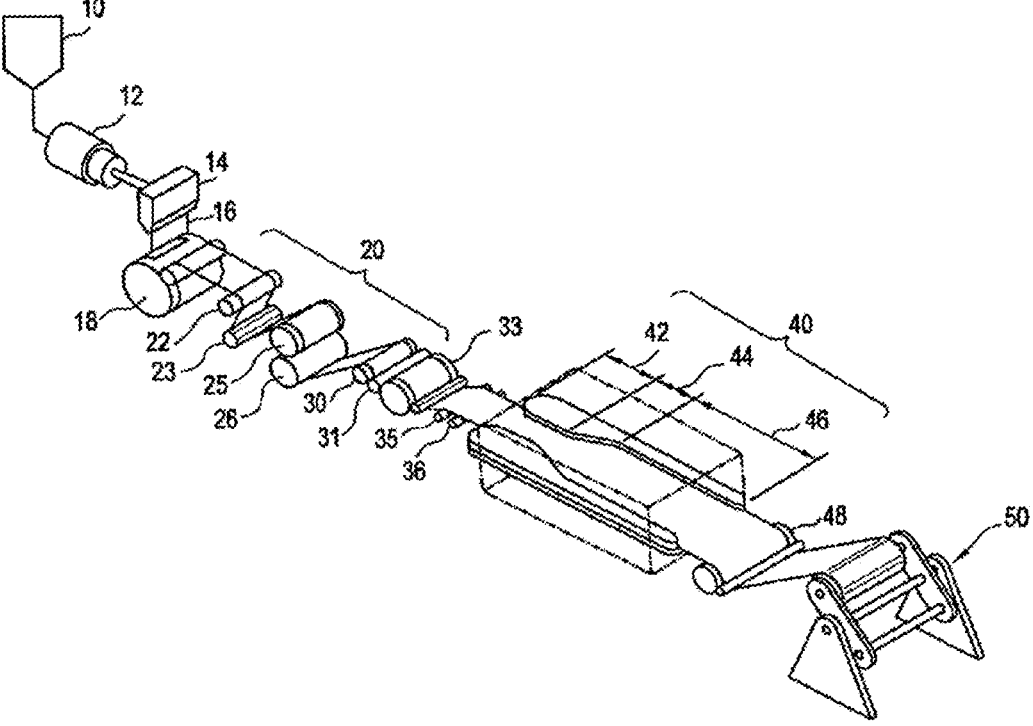
FIG. 1 shows a tenter frame system.

Embodiments disclosed herein generally relate to polyethylene-based compositions that includes ethylene-based polymers including polyethylene homopolymers and copolymers, particularly polyethylene-based compositions used for forming biaxially oriented films.

Ethylene-Based Polymer

In one or more embodiments, ethylene-based polymers may include ethylene-based homopolymers produced from ethylene. In other embodiments, the ethylene-based polymers may include ethylene-based copolymers produced from ethylene and one or more C3-C10 alpha olefin comonomers. The term "ethylene-based polymer" includes both the homopolymers produced from ethylene and copolymers produced from ethylene and one or more C3-C10 alpha olefin comonomers. The term "ethylene-based copolymer" includes copolymers produced from ethylene and one or more C3-C10 alpha olefin monomers, such as ethylene and one C3-C10 alpha olefin comonomer, or ethylene and two or more C3-C10 alpha olefins comonomers. Particularly, the term "ethylene-based terpolymer" may be used when ethylene-based copolymer includes ethylene and two C3-C10 alpha olefin comonomers. In particular embodiments, the ethylene-based copolymers may include C4-C8 alpha olefin comonomers. In other embodiments, ethylene-based copolymers may include ethylene and 1-butene or 1-octene comonomers. In particular embodiments, ethylene-based copolymers may be a terpolymer that include ethylene, 1-butene and 1-octene comonomers.

In some embodiments, the ethylene-based polymers may have an ethylene content ranging from a lower limit selected from one of 90 mol %, 91 mol %, 92 mol %, 93 mol %, and 94 mol % to an upper limit from one of 96 mol %, 97 mol %, 98 mol %, 99 mol %, 99.9 mol %, and 100 mol % of the total number of moles of the ethylene-based polymers, where any lower limit may be paired with any upper limit.

In one or more embodiments, the ethylene-based copolymers may have a content of one or more C3-C10 alpha olefin comonomers ranging from a lower limit selected from one of 0.1 mol %, 0.5 mol %, 1.0 mol %, 2.0 mol %, 3.0 mol %, and 4.0 mol % to an upper limit selected from one of 6.0 mol %, 7.0 mol %, 8.0 mol %, 9.0 mol %, and 10 mol % of the total number of moles of the ethylene-based copolymer, where any lower limit may be paired with any upper limit. Comonomer content can be measured by NMR spectroscopy.

In one or more embodiments, the ethylene-based polymers may be formed in the presence of Ziegler Natta, metallocene, single-site or chromium catalysts. Ziegler Natta catalysts used to polymerize ethylene may include titanium-based and optionally, vanadium-based compounds. Catalysts as disclosed herein may be non-supported catalysts or catalysts supported on particulate supports. The particulate support may be an inorganic-oxide-based compound and may include silica, alumina, titania, silica-alumina and silica-titania. In particular embodiments, catalysts may be a non-supported Ziegler-Natta catalyst comprising titanium and vanadium-based compounds.

In one or more embodiments, the ethylene-based polymers may have a density, according to ASTM D792, ranging from a lower limit selected from one of 945 kg/m³, 946 kg/m³, 947 kg/m³, 948 kg/m³, 949 kg/m³, 950 kg/m³, and 951 kg/m³ to an upper limit selected from 955 kg/m³, 956 kg/m³ and 957 kg/m³, 958 kg/m³, 959 kg/m³, 960 kg/m³ and 961 kg/m³ where any lower limit may be paired with any upper limit.

In one or more embodiments, the ethylene-based copolymers or terpolymers may have a density, according to ASTM D792, ranging from a lower limit selected from one of 945 kg/m³, 946 kg/m³, 947 kg/m³, 948 kg/m³, 949 kg/m³, 950 kg/m³, 951 kg/m³ and 952 kg/m³ to an upper limit selected from 955 kg/m³, 956 kg/m³, 957 kg/m³, 958 kg/m³, 959 kg/m³, 960 kg/m³ and 961 kg/m³ where any lower limit may be paired with any upper limit.

In one or more embodiments, the ethylene-based polymers may have a melt flow rate (MFR₂), according to ASTM D1238 at 190° C./2.16 kg, ranging from a lower limit selected from 0.5 g/10 min, 0.7 g/10 min, 1.0 g/10 min, 1.3 g/10 min, and 1.6 g/10 min to an upper limit selected from 2.0 g/10 min, 2.5 g/10 min, 2.8 g/10 min, and 3.0 g/10 min, where any lower limit may be paired with any upper limit.

In one or more embodiments, a stress exponent (SEx) of the ethylene-based polymers may be calculated using the following equations:

$$SEx = \frac{\log MFR_6 - \log MFR_2}{\log 6480 - \log 2160}$$

-continued $$SEx = \frac{\log R}{0.477}$$

where $MFR_2$ represents a melt flow rate according to ASTM 1238 at 190° C./2.16 kg, $MFR_6$ represents a melt flow rate according to ASTM 1238 at 190° C./6.48 kg and R is a ratio of $MFR_6$ and $MFR_2$.

In some embodiments, the ethylene-based polymers may have an SEx ranging from a lower limit selected from 1.0, 1.1, 1.2, 1.23, and 1.27 to an upper limit selected from 1.37, 1.4, 1.5, 1.6 and 1.8, where any lower limit may be paired with any upper limit.

In one or more embodiments, the ethylene-based polymer may have a weight average molecular weight (Mw), measured by gas permeation chromatography (GPC), ranging from 80,000 g/mol to 120,000 g/mol. For example, the Mw may range from a lower limit of any of 80,000 g/mol, 85,000 g/mol, 90,000 g/mol, or 100,000 g/mol, and an upper limit of any of 100,000 g/mol, 110,000 g/mol, 115,000 g/mol, or 120,000 g/mol, where any lower limit can be used in combination with any upper limit.

In one or more embodiments, the ethylene-based polymer may have a number average molecular weight (Mn), measured by GPC, ranging from 4,000 g/mol to 22,000 g/mol. For example, the Mn may range from a lower limit of any of 4,000 g/mol, 6,000 g/mol, 10,000 g/mol, or 12,000 g/mol, to an upper limit of any of 12,000, 15,000 g/mol, 18,000 g/mol, 20,000 g/mol, or 22,000 g/mol, where any lower limit can be used in combination with any upper limit.

In one or more embodiments, the ethylene-based polymer may have a Z average molecular weight (Mz), measured by GPC, ranging from 180,000 g/mol to 650,000 g/mol. For example, the Mz may range from a lower limit of any of 180,000 g/mol, 200,000 g/mol, 250,000 g/mol, 300,000 g/mol, or 350,000 g/mol, to an upper limit of any of 400,000 g/mol, 450,000 g/mol, 500,000 g/mol, 550,000 g/mol, 600, 000 g/mol, or 650,000 g/mol, where any lower limit can be used in combination with any upper limit.

In one or more embodiments, the ethylene-based polymer may have a molecular weight distribution (MWD), represented by a ratio of Mw and Mn (Mw/Mn), ranging from a lower limit selected from 3, 4, 5, 6, 7, 8, 9 and 10 to an upper limit selected from 15, 20, 21, 22, 23, 24 and 25, where any lower limit may be paired with any upper limit.

In one or more embodiments, ethylene-based polymer may have a monomodal molecular weight distribution, a bimodal molecular weight distribution or a multimodal molecular weight distribution. In particular embodiments, ethylene-based polymer may have a monomodal molecular weight distribution.

As used herein, the term "monomodal" or "bimodal" when used to describe a polymer or polymer composition, such as polyethylene, refers to a "monomodal molecular weight distribution" or a "bimodal molecular weight distribution," which term is understood to have the broadest definition persons in the art have given that term as reflected in one or more printed publications or issued patents. A material having one distinct molecular weight distribution peak will be considered to be "monomodal" as that term is used herein. When a material having two or more distinct molecular weight distribution peaks will be considered to be "bimodal" as that term is used herein although the material may also be referred to as a "multimodal" composition, e.g., a trimodal or even tetramodal composition, etc.

In one or more embodiments, the ethylene-based polymer may have a melt temperature (Tm) according to ASTM 3418 ranging from a lower limit selected from 110° C., 111° C., 112° C., 113° C., 114° C., 115° C., 116° C., 117° C., 118° C., 119° C. and 120° C. to an upper limit selected from 130° C., 131° C., 132° C., 133° C., 134° C., 135° C., 136° C., 137° C., 138° C., 139° C. and 140° C., where any lower limit may be paired with any upper limit.

In one or more embodiments, the ethylene-based polymer may have a crystallization temperature (Tc) according to ASTM 3418 ranging from a lower limit selected from 65° C. to an upper limit selected from 125° C., where any lower limit may be paired with any upper limit.

In one or more embodiments, the ethylene-based polymer may have a complex viscosity at 0.09 rad/s ranging from 3,000 to 25,000 Pa·s.

In one or more embodiments, the ethylene-based polymer may have a complex viscosity at 300 rad/s ranging from 100 to 2,000 Pa·s.

In one or more embodiments, the ethylene-based polymer may have a shear thinning index SHI5/200, being the ratio of the complex shear modulus at 5 kPa to the complex shear modulus at 200 kPa, of from 2 to 18.

In one or more embodiments, the ethylene-based polymer may have a shear thinning index SHI2.7/210, being the ratio of the complex shear modulus at 2.7 kPa to the complex shear modulus at 210 kPa, of from 2 to 26.

In one or more embodiments, the ethylene-based polymer may have an elasticity balance tan 0.09/tan 300, being the ratio of the loss tangent at 0.09 rad/s to the loss tangent at 300 rad/s, of from 1 to 26.

In one or more embodiments, the ethylene-based polymer may have a total biobased carbon content in a range having a lower limit selected from any of 5, 10, or 20%, to an upper limit selected from any of 50%, 90%, and 100%, where any lower limit may be combined with any upper limit. Biobased products obtained from natural materials may be certified as to their renewable carbon content, according to the methodology described in the technical standard ASTM D 6866-18, "Standard Test Methods for Determining the Biobased Content of Solid, Liquid, and Gaseous Samples Using Radiocarbon Analysis".

The total bio-based or renewable carbon in the ethylene-based polymers may be contributed from a bio-based ethylene. For example, in one or more embodiments, the renewable source of carbon is one or more plant materials selected from the group consisting of sugar cane and sugar beet, maple, date palm, sugar palm, sorghum, American agave, corn, wheat, barley, sorghum, rice, potato, cassava, sweet potato, algae, fruit, materials comprising cellulose, wine, materials comprising hemicelluloses, materials comprising lignin, wood, straw, sugarcane bagasse, sugarcane leaves, corn stover, wood residues, paper, and combinations thereof.

In one or more embodiments, the bio-based ethylene may be obtained by fermenting a renewable source of carbon to produce ethanol, which may be subsequently dehydrated to produce ethylene. Further, it is also understood that the fermenting produces, in addition to the ethanol, byproducts of higher alcohols. If the higher alcohol byproducts are present during the dehydration, then higher alkene impurities may be formed alongside the ethanol. Thus, in one or more embodiments, the ethanol may be purified prior to dehydration to remove the higher alcohol byproducts while in other embodiments, the ethylene may be purified to remove the higher alkene impurities after dehydration.

Thus, biologically sourced ethanol, known as bio-ethanol, is obtained by the fermentation of sugars derived from cultures such as that of sugar cane and beets, or from hydrolyzed starch, which is, in turn, associated with other cultures such as corn. It is also envisioned that the bio-based ethylene may be obtained from hydrolysis-based products of cellulose and hemi-cellulose, which can be found in many agricultural by-products, such as straw and sugar cane husks. This fermentation is carried out in the presence of varied microorganisms, the most important of such being the yeast *Saccharomyces cerevisiae*. The ethanol resulting therefrom may be converted into ethylene by means of a catalytic reaction at temperatures usually above 300° C. A large variety of catalysts can be used for this purpose, such as high specific surface area gamma-alumina. Other examples include the teachings described in U.S. Pat. Nos. 9,181,143 and 4,396,789, which are herein incorporated by reference in their entirety.

In one or more embodiments, the ethylene-based polymer may contain a number of functional additives that modify various properties of the composition. Such additives may include antioxidants, acid scavengers, pigments, fillers, reinforcements, adhesion-promoting agents, biocides, whitening agents, nucleating agents, anti-statics, anti-blocking agents, processing aids, flame-retardants, plasticizers, light stabilizers, UV stabilizers and the like.

In some embodiments, the ethylene-based polymer may have an additive content ranging from a lower limit selected from 0 wt %, 1 wt %, and 2 wt % to an upper limit selected from 3 wt %, 4 wt %, and 5 wt % based on the total weight of the polyethylene-based composition, where any lower limit may be paired with any upper limit.

Ethylene-based polymers according to the present disclosure may be produced in any known polymerization process, including but not limited to solution polymerization, gas phase polymerization, or slurry polymerization.

In particular embodiments, the polymerization process is a solution polymerization process. Generally in solution polymerizations, both the catalyst and the resulting polymer remain dissolved in a solvent that must be removed to isolate the polymer. Various solvents may be used, such as linear, branched or cyclic C5 to C12 alkanes, including, for example, cyclohexane. Ethylene may be solubilized in cyclohexane and sent to a reaction area. Alpha-olefins, such as 1-butene, or 1-octene, may be used as a comonomer to determine the density of the product.

In the reaction section, a catalytic solution is injected to promote the polymerization of the ethylene and the comonomer. Solution polymerization may include non-adiabatic reactors as well as adiabatic reactors. For example, in one or more embodiments, several adiabatic tubular reactors (e.g., three), may be followed by a stirred autoclave, and then an adiabatic tubular (Trimmer), respectively. The operating conditions of the system may be adjusted depending on the type of polymer being produced and depending on the desired properties such as molecular weight distribution (SEX), density and melt index. Generally, the temperature profile in the reactors may range from 105 to 315° C., depending on the reaction module. For example, it is envisioned that there are two reaction modules: Module 1 and Module 2. In Module 1, the catalyst is injected into the stirred autoclave (when the agitator is in operation), while the non-adiabatic reactor behaves like a pipeline (no reaction). In Module 2, the catalyst is injected into the inlet of the non-adiabatic reactor, and the agitator of the autoclave reactor remains stopped. In all cases the Trimmer reactor is in operation. The operating pressure can range from 120 $kgf/cm^2$ to 160 $kgf/cm^2$.

In particular embodiments, such solution polymerization takes place under the presence of first generation Ziegler-Natta type catalysts comprising titanium and vanadium. Catalysts may be activated in three steps in the process before entering the reactor. In the first activation step, the catalyst is mixed with a reducing agent. After reduced, the catalyst undergoes a thermal treatment with heated cyclohexane (210-260° C.) and then mixed with an alkylating agent (alkylation). In some embodiments the catalyst can be injected at the entrance of the first tubular reactor and the properties are controlled through the reaction temperature profile, hydrogen injection along the tubular reactor and molar ratio of comonomer.

The polymer solution (after the reaction) is heated between the range of 285~300° C. in order to avoid phase separation in the adsorber beds whose function is to remove catalyst residues. In order for the catalyst to be removed, it may be previously deactivated by deactivators.

After the adsorber vessels, the solution goes to the separators where all the hydrocarbons (solvent, monomer and comonomer) are separated and sent to the distillation area to be purified and separated.

Other embodiments may use slurry polymerization that, unlike solution polymerization where the polymer remains dissolved, the resulting polymer is suspended in the liquid medium without dissolving. Slurry polymerizations may include loop reactors, stirred tank reactors, and tubular reactors. Olefin monomers like ethylene and optionally one or more alpha-olefin comonomer(s) are polymerized in a in a hydrocarbon diluent, such as propane or isobutane, in the presence of a polymerization catalyst, and optionally in the presence of hydrogen at elevated pressure and temperature. The temperature in the loop may range from about 60° C. to about 110° C., and optionally at supercritical conditions, where the operating temperature exceeds the critical temperature of the reaction mixture and the operating pressure exceeds the critical pressure of the reaction mixture. At such conditions, the operation temperature may be higher than 90° C.

The operating pressure may be selected so that the contents of the reactor remain either in liquid state or supercritical state. For liquid slurry operation, the suitable range of operating pressure may range from about 20 to about 100 bar, and for supercritical slurry operation, the suitable range of operating pressure may range from about 50 to about 100 bar. The slurry is withdrawn from the reactor and concentrated, such as in a hydrocyclone or in settling legs for loop reactors, so that the solids content at the reactor outlet is higher than the solids content in the reactor. The concentrated slurry may be conveyed to a flash unit for essentially evaporating all of the remaining liquid-phase hydrocarbons of the slurry phase diluent.

In gas phase polymerizations, most of the reaction fluid in the reactor is in the gaseous state and the polymer is in particulate form. Such reactors may include, for example, a gas-phase fluidized-bed reactor or a stirred bed reactor. In such reactors, a bed of polymer is formed in the presence of a polymerization catalyst. A gas phase reactor may be operated at a temperature ranging from about 60° C. to about 115° C., and at an operating pressure ranging from 10 to 30 bar.

In a fluidized bed gas phase reactor, an olefin is polymerized in the presence of a polymerization catalyst in an upwards moving gas stream. The reactor typically contains a fluidized bed comprising the growing polymer particles containing the active catalyst located above a fluidization grid. When the fluidization gas is contacted with the bed containing the active catalyst, the reactive components of the gas, such as monomers and chain transfer agents, react in the presence of the catalyst to produce the polymer product.

Secondary Polymers

In one or more embodiments, the polyethylene-based compositions may contain one or more secondary polymers to modify various properties of the composition. Such secondary polymers may include various types of polyethylene including high density polyethylene (HDPE), medium density polyethylene (MDPE), linear low density polyethylene (LLDPE), low density polyethylene (LDPE), and combinations thereof. The secondary polymer may also include ethylene-based elastomers and ethylene-based plastomers. In some embodiments, the polyethylene-based composition may contain one or more secondary polymers that are previously-processed polymers. "Previously-processed polymers" refer to as polymers that have previously been used and may include blends or coextruded formulations for reprocessed films, regrinds, post-consumer resins, post-industrial resins, and the likes. In one or more embodiments, the secondary polymers may have a bio-based carbon content of at least 5%. In particular embodiments, the secondary polymer is a LLDPE or a LDPE. In more particular embodiments, the secondary polymer is a LLDPE produced from a metallocene catalyst or a Ziegler-Natta catalyst or LDPE produced in autoclave or tubular high pressure polymerization. Examples of suitable secondary polymers are polyethylenes commercialized by Braskem including, but not limited to LLDPE such as Proxess3310, Proxess2606, FP33, LF320 among other LLDPEs and LDPE such as TS9022 and BC818, among other LDPEs.

In one or more embodiments, a stress exponent (SEx) of the secondary polymer may be calculated using the following equations:

$$SEx = \frac{\log MFR_6 - \log MFR_2}{\log 6480 - \log 2160}$$

$$SEx = \frac{\log R}{0.477}$$

where $MFR_2$ represents a melt flow rate according to ASTM 1238 at 190° C./2.16 kg, $MFR_6$ represents a melt flow rate according to ASTM 1238 at 190° C./6.48 kg and R is a ratio of $MFR_6$ and $MFR_2$.

In some embodiments, the secondary polymer may have an SEx ranging from a lower limit selected from 1.0, 1.1, 1.2, 1.23, and 1.27 to an upper limit selected from 1.37, 1.4, 1.5, 1.6, 1.8, 2.0, 2.5, 2.8 and 3.0 where any lower limit may be paired with any upper limit.

In one or more embodiments, the secondary polymer may have a Mw, measured by GPC, ranging from 50,000 g/mol to 600,000 g/mol. For example, the Mw may range from a lower limit of any of 50,000 g/mol, 60,000 g/mol, 65,000 g/mol, 70,000 g/mol, 75,000 g/mol, 80,000 g/mol, 85,000 g/mol, 90,000 g/mol, and 100,000 g/mol, and an upper limit of any of 100,000 g/mol, 110,000 g/mol, 115,000 g/mol, 120,000 g/mol, 125,000 g/mol, 150,000 g/mol, 175,000 g/mol, 200,000 g/mol, 300,000 g/mol, 400,000 g/mol, 500, 000 g/mol and 600,000 g/mol, where any lower limit can be used in combination with any upper limit.

In one or more embodiments, the secondary polymer may have a Mn, measured by GPC, ranging from 4,000 g/mol to 50,000 g/mol. For example, the Mn may range from a lower limit of any of 4,000 g/mol, 6,000 g/mol, 10,000 g/mol, and 12,000 g/mol, to an upper limit of any of 12,000, 15,000 g/mol, 18,000 g/mol, 20,000 g/mol, 22,000 g/mol, 25,000 g/mol, 30,000 g/mol, 35,000 g/mol, 40,000 g/mol, 45,000 g/mol and 50,000 g/mol, where any lower limit can be used in combination with any upper limit.

In one or more embodiments, the secondary polymer may have a Mz, measured by GPC, ranging from 100,000 g/mol to 5,000,000 g/mol. For example, the Mz may range from a lower limit of any of 100,000 g/mol, 125,000 g/mol, 150,000 g/mol, 180,000 g/mol, 200,000 g/mol, and 250,000 g/mol, to an upper limit of any of 300,000 g/mol, 350,000 g/mol, 400,000 g/mol, 450,000 g/mol, 500,000 g/mol, 550,000 g/mol, 600,000 g/mol, 650,000 g/mol, 675,000 g/mol, 700,000 g/mol, 725,000 g/mol, 1,000,000 g/mol, 2,000,000 g/mol, 3,000,000 g/mol, 4,000,000 g/mol and 5,000,000 g/mol, where any lower limit can be used in combination with any upper limit.

In one or more embodiments, the secondary polymer compositions may have an MWD, or Mw/Mn, ranging from a lower limit selected from 2, 3, 4, 5, 6, 8 and 10 to an upper limit selected from 7, 8, 9, 10, 12, 15, 20, 30, 40 and 50, where any lower limit may be paired with any upper limit.

In one or more embodiments, the secondary polymer may have a density, according to ASTM D792, ranging from a lower limit selected from one of 890 kg/m³, 900 kg/m³, 910 kg/m³, 920 kg/m³, 930 kg/m³ and 940 kg/m³, to an upper limit selected from 945 kg/m³, 950 kg/m³ and 951 kg/m³, 952 kg/m³, 953 kg/m³, 955 kg/m³, 960 kg/m³ and 961 kg/m³, where any lower limit may be paired with any upper limit.

In one or more embodiments, the secondary polymer may have an MFR$_2$, according to ASTM D1238 at 190° C./2.16 kg, ranging from a lower limit selected from any one of 0.5 g/10 min, 0.6 g/10 min, 0.7 g/10 min, 0.8 g/10 min, 0.9 g/10 min, 1.0 g/10 min, 1.5 g/10 min, 1.8 g/10 min, 2.0 g/10 min, 2.4 g/10 min, 2.5 g/10 min, 5.0 g/10 min, 7.0 g/10 min and 7.1 g/10 min to an upper limit selected from any one of 2.5 g/10 min, 2.6 g/10 min, 2.7 g/10 min, 2.8 g/10 min, 2.9 g/10 min, 3.0 g/10 min, 5.0 g/10 min, 6.0 g/10 min, 7.0 g/10 min, 8 g/10 min, 9 g/10 min, 9.5 g/10 min, 10 g/10 min, 15 g/10 min, 20 g/10 min, 25 g/10 min and 30 g/10 min, where any lower limit may be paired with any upper limit.

In one or more embodiments, the secondary polymer may have a melt temperature (Tm) according to ASTM 3418 ranging from a lower limit selected from 95° C., 98° C., 100° C., 105° C., 110° C., 111° C., 112° C., 113° C., 114° C., 115° C., 116° C., 117° C., 118° C., 119° C. and 120° C. to an upper limit selected from 130° C., 131° C., 132° C., 133° C., 134° C., 135° C., 136° C., 137° C., 138° C., 139° C. and 140° C., where any lower limit may be paired with any upper limit.

In one or more embodiments, the secondary polymer may have a crystallization temperature (Tc) according to ASTM 3418 ranging from a lower limit selected from any one of 45° C., 50° C., 55° C., 60° C. and 65° C., to an upper limit selected from any one of 70° C., 80° C., 90° C., 100° C. and 125° C., where any lower limit may be paired with any upper limit.

In one or more embodiments, the secondary polymer may have a complex viscosity at 0.09 rad/s ranging from 1,000 to 25,000 Pa·s.

In one or more embodiments, the secondary polymer may have a complex viscosity at 300 rad/s ranging from 100 to 2,000 Pa·s.

In one or more embodiments, the secondary polymer may have a shear thinning index SHI5/200, being the ratio of the complex shear modulus at 5 kPa to the complex shear modulus at 200 kPa, of from 2 to 18.

In one or more embodiments, the secondary polymer may have a shear thinning index SHI2.7/210, being the ratio of the complex shear modulus at 2.7 kPa to the complex shear modulus at 210 kPa, of from 2 to 26.

In one or more embodiments, the secondary polymer may have an elasticity balance tan 0.09/tan 300, being the ratio of the loss tangent at 0.09 rad/s to the loss tangent at 300 rad/s, of from 1 to 26.

In one or more embodiments, the secondary polymer may contain a number of functional additives that modify various properties of the composition. Such additives may include antioxidants, acid scavengers, pigments, fillers, reinforcements, adhesion-promoting agents, biocides, whitening agents, nucleating agents, slip agents, anti-statics, anti-blocking agents, processing aids, flame-retardants, plasticizers, light stabilizers, UV stabilizers and the like.

In some embodiments, the secondary polymer may have an additive content ranging from a lower limit selected from 0 wt %, 1 wt %, and 2 wt % to an upper limit selected from 3 wt %, 4 wt %, and 5 wt % based on the total weight of the polyethylene-based composition, where any lower limit may be paired with any upper limit.

Polyethylene-Based Compositions

In one or more embodiments, polyethylene-based compositions may have a content of the ethylene-based polymer ranging from a lower limit selected from 50 wt %, 60 wt %, and 70 wt % to an upper limit selected from 80 wt %, 90 wt % and 100 wt % based on the total weight of the polyethylene-based composition, where any lower limit may be paired with any upper limit.

In one or more embodiments, the polyethylene-based compositions may contain one or more secondary polymers in an amount ranging from a lower limit selected from 0 wt %, 10 wt % and 15 wt % to an upper limit selected from 20 wt %, 30 wt % and 50 wt % based on the total weight of the polyethylene-based composition, where any lower limit may be paired with any upper limit.

The polyethylene-based compositions may be particularly suitable for forming various articles, including but not limited to films (including single or multilayer films). In one or more embodiments, the polyethylene-based compositions may be used to form blown films, cast films, mono-oriented films or biaxially oriented films. In one or more embodiments, the polyethylene-based compositions may be used to form a biaxially oriented film. It is also envisioned that the films described herein can be used a range of applications, where good barrier properties are an advantage, as well as any other uses known to those of ordinary skill in the art for polyethylene films.

As mentioned above, the ethylene-based polymers may be used alone or in combination with one or more secondary polymers in the polyethylene-based compositions. Thus, a layer including the ethylene-based polymer (and polyethylene-based composition) may include at least 1.0 wt % of the layer, such as from 1.0 to 100 wt %, in which it is present. In particular embodiments, the ethylene-based polymer may form at least 30.0 wt %, at least 50.0 wt %, at least 70.0 wt. %, at least 80 wt. %, or at least 90 wt. % of the layer in which it is present.

In one or more embodiments, films of the present disclosure may have a haze of 95% or lower, according to ASTM 1003D, when a thickness of the biaxially oriented film is 20 μm. More particular embodiments may have a haze of 85% or less, 75% or less, 65% or less, 50% or less, 40% or less, 30% or less, 20% or less, 15% or less, 10% or less, or 5% or less.

In one or more embodiments, films of the present disclosure may have a gloss at 45° of 5 g.u. or higher, according to ASTM D2457, such as 10 g.u. or higher, 20 g.u. or higher, 30 g.u. or higher, 40 g.u. or higher, 50 g.u. or higher, 60 g.u. or higher, 70 g.u. or higher or 75 g.u. or higher.

In one or more embodiments, films of the present disclosure may have a tensile modulus of 1000 MPa or higher, according to ASTM D882, in a machine direction of the biaxially oriented film, such as 1050 MPa or higher, 1100 MPa or higher, as 1200 MPa or higher, 1300 MPa or higher or 1400 MPa or higher.

In one or more embodiments, films of the present disclosure may have a tensile modulus of 1000 MPa or higher according to ASTM D882 in a transverse direction of the biaxially oriented film, such as 1050 MPa or higher, 1100 MPa or higher, as 1200 MPa or higher, 1300 MPa or higher or 1400 MPa or higher, 1500 MPa or higher, 1700 MPa or higher or 2000 MPa or higher.

In one or more embodiments, films of the present disclosure may have a roughness (Ra) ranging from 20 nm to 500 nm, according to ISO 4287:1997 measured by Atomic Force Microscopy (AFM). In one or more embodiments, films may have a roughness (Ra) ranging from a lower limit selected from 20 nm, 30 nm, 40 nm, 50 nm, 100 nm, 150 nm and 200 nm to an upper limit selected from 50 nm, 150 nm, 200 nm, 300 nm, 400 nm and 500 nm, where any lower limit may be paired with any upper limit.

In one or more embodiments, a multilayer film may include at least two layers, or at least three layers, where at least one of which is formed from the polyethylene-based compositions disclosed herein. In one or more embodiments, a multilayer film may include one layer of film comprising at least one secondary polymer selected from the group consisting of HDPE, MDPE, LLDPE, LDPE, ethylene-based elastomers, and ethylene-based plastomers. In some embodiments, the at least one layer of one or more secondary polymers includes previously-processed polymers such as blends or coextruded formulations for reprocessed films, regrinds, post-consumer resins, post-industrial resins, and the likes. In one or more embodiments, the at least one layer of one or more secondary polymers may have a bio-based carbon content of at least 5%.

In embodiments having at least three layers, the layers may be arranged such the layer formed from the polyethylene-based composition of the present disclosure is an internal or core layer between two external or skin layers. In embodiments having at least five or seven layers, the layers may be arranged such that the layer formed from the polyethylene-based composition of the present disclosure may include one or more internal or core layers between two external or skin layers. Skin layers may be selected, for example, from LLDPE, LDPE, or other polyethylene grades such as elastomers or plastomers having a density of at most 940 kg/m³, such as from 860 to 936 kg/m³.

In one or more embodiments, the multilayer films may be formed to have a maximum thickness of about 3 mil, or more specifically, 1 mil or 0.5 mil in more particular embodiments. For example, in one or more embodiments, each skin layer may have a thickness less than 0.2 mil, such as in a range of 0.02 to 0.06 mil in thickness.

Films may be formed, for example, in a two-step process, where a film is first formed, such as through melt extrusion casting, which is cooled and then reheated to a softened state where it is deformable (below melting temperature) and stretched in one or more directions.

The manufacture of biaxially oriented films may use a tenter frame process in which, the components of the film are initially mixed and melted within an extruder. The temperature within the extruder may be selected to ensure melting of the components. The extrudate is cast to form a cast film (or flat film) which is then cooled, such as to a temperature less than 70° C. before any reheating process is begun. After cooling, the film is then reheated, and stretching is begun. The temperature during the stretching phase can vary and may decrease as the stretching process continues. Once stretching in the machine direction is complete, the film is annealed. This maintains the machine direction oriented (MDO) film structure for the transversal direction (TD_stretch. Reheating for the second stretching phase is carried out and the temperature can vary during the stretching phase. Finally, the film is allowed to cool.

One or more embodiments for manufacturing films may include the following steps. First, the resin may be melted and homogenized in an extruder, and resulting melt, may be formed into a casting or cast film which is cooled to a temperature less than 70° C. The casting is then heated to temperatures such as between 80 and 110° C., and stretched, such as on a tenter frame, in a machine direction at a ratio between 1:3 to 1:10. It is noted that the indicated temperature may be the temperature at the start of the stretching process, and may vary as the stretching process goes on. The MDO-stretched film may then be annealed at temperatures between 50 and 90° C., and then reheated to temperatures between 100 and 150° C. for stretching in transverse direction at a ratio between 1:5 to 1:10. Again, it is noted that the indicated temperature may be the temperature at the start of the stretching process, and may vary as the stretching process goes on.

One or more embodiments also relate to a process for preparing such films that comprises the steps of: (I) providing a core layer composition, the polyethylene based polymers as described above, and a skin layer composition,; (II) coextruding the core and skin layer compositions to produce a casting having adjacent core and skin layers, optionally with an additional skin layer to form a casting having the structure seal/core/seal; and (III) heating while stretching the casting in both longitudinal and transverse directions to produce an oriented film.

As mentioned above, film production in accordance with the present embodiments can be of any suitable technique including the tenter processing. In tenter frames, the polymer or polymers used to make the film are melted and then passed through an extruder to a slot die mechanism after which it is passed over a first roller, characterized as a chill roller, which tends to solidify the film. The film is then oriented by stressing it in a longitudinal direction, characterized as the machine direction, and in a transverse direction to arrive at a film which can be characterized in terms of orientation ratios, sometimes also referred to as stretch ratios, in both longitudinal and transverse directions.

The machine direction orientation may be accomplished through the use of two sequentially disposed rollers, the second or fast roller operating at a speed in relation to the slower roller corresponding to the desired orientation ratio. This may alternatively be accomplished through a series of rollers with increasing speeds, sometime with additional intermediate rollers for temperature control and other functions. After the film has been stressed in the machine direction, it is again cooled and then pre-heated and passed into a lateral stressing section, for example, a tenter frame mechanism, where it is again stressed, this time in the transverse direction. Orientation in the transverse direction may be followed by an annealing section. Subsequently, the film is then cooled and may be subjected to further treatment, such as a surface treatment (for example corona treatment or flame treatment).

FIG. 1 illustrates a tenter frame that may be employed in producing biaxially-oriented polyethylene film in accordance with the present disclosure. In FIG. 1, a source of molten polymer is supplied from a heated hopper 10 to an extruder 12 and from there to a slot die 14 which produces a flat, relatively thick film 16 at its output. Film 16 is applied over a chill roller 18, and it is cooled to a suitable temperature. The film is drawn off the chill roller 18 to a stretching section 20 to which the machine direction orientation occurs by means of idler rollers 22 and 23 that lead to preheat rollers 25 and 26.

As the film is drawn off the chill roller 18 and passed over the idler rollers, it is cooled to a temperature of less than 70° C., such as between 30 and 60° C. In stretching the film in the machine direction, it is heated by preheat rollers 25 and 26 to an incremental temperature increase of about 80-110° C. and is oriented by fast roller 31 operating at a suitable speed greater than that of the preheat rollers in order to orient the film in the machine direction.

As the oriented film is withdrawn from the fast roller 31, it is passed over a roller 33 at room temperature conditions. From here it is passed over rollers to a lateral stretching section 40 where the film is oriented by stretching in the transverse direction. The section 40 includes a preheat section 42 comprising a plurality of tandem heating rollers (not shown) where it is reheated to a temperature within the range of 100-150° C. From the preheat section 42 of the tenter frame, the film is passed to a stretching or draw section 44 where it is progressively stretched by means of tenter clips (not shown) which grasp the opposed sides of the film and progressively stretch it laterally until it reaches its maximum lateral dimension. The concluding portion of the lateral stretching phase includes an annealing section 46, such as an oven housing, where the film is heated at a temperature within the range of 50-90° C. for a suitable period in time. The annealing time helps control certain properties, and increased annealing is often specifically used to reduce shrinkage.

The biaxially oriented film is then withdrawn from the tenter frame and passed over a chill roller 48 where it is reduced to a temperature of less than about 50° C. and then applied to take-up spools on a takeup mechanism 50. Typically, the initial orientation in the machine direction is carried out at a somewhat lower temperature than the orientation in the lateral dimension. For example, the film may be stretched in the machine direction at a temperature of about 90° C. and stretched in the lateral dimension at a temperature of 120° C.

During the biaxially stretching, the stretching may have a total stretching ratio in the machine direction ranging from 1:3 to 1:10, and a total stretching ratio in the transverse direction ranging from 1:5 to 1:10. Further, the biaxially stretching may have a machine direction speed ranging from 250 to 750 mm/s.

In one or more embodiments, the stretching ratio in the machine direction may have a lower limit of any of 1:3 or 1:4 to an upper limit of any of 1:7, 1:8, or 1:10, where any lower limit can be used in combination with any upper limit.

In one or more embodiments, the stretching ratio in the transverse direction may have a lower limit of any of 1:5 or 1:55 to an upper limit of any of 1:7, 1:9, or 1:10, where any lower limit can be used in combination with any upper limit. Further, in particular embodiments, the MD stretch ratio may be less than the TD stretch ratio.

EXAMPLES

Measurement Methods

MFR

The melt flow rates are measured at 190° C. with a load of 2.16 kg (MFR$_2$) or 6.48 kg (MFR$_6$) according to ASTM D1238.

Density

The density was measured according to ASTM D792.

SEx

SEx was measured according to the equation below:

$$SEx = \frac{\log MFR_6 - \log MFR_2}{\log 6480 - \log 2160}$$

$$SEx = \frac{\log R}{0.477}$$

where MFR$_2$ represents a melt flow rate according to ASTM 1238 at 190° C./2.16 kg, MFR$_6$ represents a melt flow rate according to ASTM 1238 at 190° C./6.48 kg and R is a ratio of MFR$_6$ and MFR$_2$.

Gloss and Haze

Gloss and haze as measured for the optical appearance of the films were determined according to ASTM D2457 (gloss 45°) and ASTM D1003 (haze).

E-Modulus

E-modulus was measured on the films according to ASTM D882.

Comonomer Determination

Comonomer determination was made by NMR spectroscopy. The composition of comonomers (incorporated alphaolefin) was determined by 13C NMR spectroscopy. Polymers (200 mg) were dissolved in a solvent blend of deuterated tetrachloroethylene and 1,2 dichlorobenzene (25 to 75% v/v) under heating in 10 mm tube. The spectra were recorded with a Bruker AVANCE III HD spectrometer operating at 125 MHz for 13C (1H 500 MHz) at 120° C., using a dul C—H He cooled 10 mm probe. 13C spectra were recorded under the following operating conditions: zgpg30 sequence (with nuclear Overhauser enhancement), acquisition time 2.5 s, relaxation delay 10 s, 1024 scans. Residual carbon Sδ+δ+(δ 30.00 ppm) of polyethylene were used as internal reference for 13C NMR spectra, respectively. 13C NMR comonomer content and distributions were determined according by the methodology proposed by J. C. Randall et al. "A Review Of High Resolution Liquid [13]Carbon Nuclear Magnetic Resonance Characterizations Of Ethylene-Based Polymers" that provides general methods of polymer analysis by NMR spectroscopy [DOI: 10.1080/07366578908055172] and is incorporated herein in its entirety.

Molar Mass

Molar Mass (Mw, Mn, Mz, MWD) were measured by GPC 3D. The GPC experiments may be carried out by gel permeation chromatography coupled with triple detection, with an infrared detector IRS and a four-bridge capillary viscometer (PolymerChar), both provided by Polymer Char, and an eight-angle light scattering detector from Wyatt. A set of 4 mixed bed, 300 mm length and 13 µm particle size columns may be used at a temperature of 140° C. The experiments may use a concentration of 1 mg/mL, a nominal flow rate of 1 mL/min, a dissolution temperature of 160° C. and time ranging from 60 to 120 minutes under shake inside equipment's oven, depending on the sample molecular weight, an injection volume of 200 mL, and a 1,2,4 trichlo-robenzene stabilized with 100 ppm of BHT as solvent and mobile phase.

Molecular weight was calculated by means of universal calibration. Intrinsic viscosity was determined from the ratio of specific viscosity (viscometer signal) and concentration (infrared signal) at each slice of chromatogram.

Molecular weight averages and polydispersity were cal-culated according to Striegel, André et. al. Modern Size Exclusion Liquid Chromatography: Practice of Gel Perme-ation and Gel Filtration Chromatography. 2nd Edition. New York: John Wiley & Sons, 2009.

Melt Temperature

Melt temperature was measured by DSC according to ASTM D3418.

Average Roughness (Ra)

Roughness of the bioriented films is related to surface texture, more specifically, average roughness (Ra) of the bioriented films. The Arithmetic average roughness (Ra) means the absolute values of the profile height deviations from the mean line, recorded within the evaluation length. Ra measurements may be performed using AFM (Nanos-cope VIII from Bruker) in tapping mode using a probe of Antimony doped silica (TESP V2 from Bruker) on the bi-oriented films produced according to the present disclo-sure, where TDX is the "X" axis and MD is the "Y" axis on AFM image. The average roughness (Ra) is evaluated according to ISO 4287:1997 (item 4.2.1). The height image with scan size 40 µm (512 data points per line) were used to perform measures in 5 different lines distributed in the extension of the image. The results reported are the average of these 5 measurements. No plane fit or filter are applied in the image to obtain the measurement, as shown on FIGS. 7A-C, 8A-C and 9A-C.

Rheological Parameters

The measurements of the dynamic shear measurements were performed on an DHR3 rotational rheometer, from TA Instruments, equipped with 25 mm parallel plates. Angular frequencies between 0.09 and 500 rad/s were measured at a stress of 200 Pa, at 200° C., under a nitrogen atmosphere and setting a gap of 1 mm. Measurements were undertaken on compression molded samples. The sample was placed in a press and heated up to 200° C., for 2 min, under pressure of 30 bar. After the temperature was reached, the sample was pressed at 100 bar for 3 min.

Complex viscosity and loss tangent (tan δ) values at specific angular frequencies (δ) are obtained according to the method above. Elasticity balance (tan 0.09/tan 300) is calculated by the ratio of the loss tangent at 0.09 rad/s to the loss tangent at 300 rad/s.

The determination of the Shear Thinning Index, is done as described in equation below.

$$SHI_{(x/y)} = \frac{\eta^* \text{ for } (G^* = x \text{ kPa})}{\eta^* \text{ for } (G^* = y \text{ kPa})}$$

For example, the $SHI_{(2.7/210)}$ is defined by the value of the complex viscosity, $\eta^*$, in Pa·s, determined for a value of complex modulus, G*, equal to 2.7 kPa, divided by the value of the complex viscosity, in Pa·s, determined for a value of G* equal to 210 kPa and the $SHI_{(5/200)}$ is defined by the value of the complex viscosity, $\eta^*$, in Pa·s, determined for a value of complex modulus, G*, equal to 5 kPa, divided by the value of the complex viscosity, in Pa·s, determined for a value of G* equal to 200 kPa.

Example 1: Comparative Examples CE1-CE3 and Inventive Example 1

Several resins were selected to be tested to produce biaxially-oriented films and the properties of those resins are shown in Table 1 below.

TABLE 1

| | | Example | | | |
|---|---|---|---|---|---|
| | | CE1 | CE2 | CE3 | 1 |
| Polymer | | PE-1 | PE-3 | PE-4 | BF-1 |
| Braskem Product | | HD4601 | HE150 | GE7252 | HD5000 |
| Catalyst | | ZN | ZN | ZN | ZN |
| Technology | | Gas-phase | Gas-phase | Slurry | Solution |
| Molecular weight distribution modality | | Mono-modal | Mono-modal | Bimodal | Mono-modal |
| MFR2 | g/10 min | 2 | 1.0 | 1.3 | 1.0 |
| Density | kg/cm³ | 942 | 947 | 959 | 952 |
| Comonomer Type | | 1-hexene | 1-butene | 1-butene | N/A |
| Melting Point | ° C. | 129 | 133 | 133 | 130 |
| % Crystallinity | % | 74 | 70 | 77 | 80 |
| Melting Enthalpy (Hf) | J/g | 213 | 200 | 220 | 230 |
| Tc | ° C. | 78; 115 | 118 | 118 | 118 |
| Mn | g/mol | 17200 | 20600 | 15000 | 14000 |
| Mw | g/mol | 96300 | 144800 | 129000 | 137000 |
| Mz | g/mol | 309750 | 514400 | 480000 | 687000 |
| Mw/Mn | | 5.6 | 7.01 | 8.6 | 9.8 |
| Mz/Mw | | 3.2 | 3.3 | 5.0 | 3.7 |
| Mz/Mn | | 18.0 | 16.3 | 5.0 | 32 |

Using the above polymers, unoriented sheets of 80×80 mm, thickness 780 µm, were prepared using a twin-screw extruder. A KARO V sheet stretching machine, obtainable from Bruckner Maschinenbau, was used to stretch the sheets in simultaneous operation. The drawing speed was 300%/s, and the drawing temperature at 125° C. All test specimens were pre-heated for 120 s before stretching force was applied. The draw ratio was monitored during the bi-direc-tional stretching process. The drawing parameters are shown in Table 2 below.

TABLE 2

| | Example | | | |
|---|---|---|---|---|
| | CE1 | CE2 | CE3 | 1 |
| Polymer | PE-1 | PE-3 | PE-4 | BF-1 |
| Max. drawing MD | 8.5 | 3.2 | 4.5 | 5 |
| Max. drawing TD | 8.5 | 3.2 | 4.5 | 5 |
| MD × TD | 72 | 10 | 20 | 25 |

\* Max drawing MD: the drawing ratio applied in the machine direction, calculated as the ratio of the length in MD after drawing to the length in MD prior to drawing.
\* Max drawing TD: the drawing ratio applied in the transversal direction, calculated as the ratio of the length in TD after drawing to the length in TD prior to drawing.
\* MD × TD is the max drawing MD multiplied by the max drawing TD.

Figure 2:
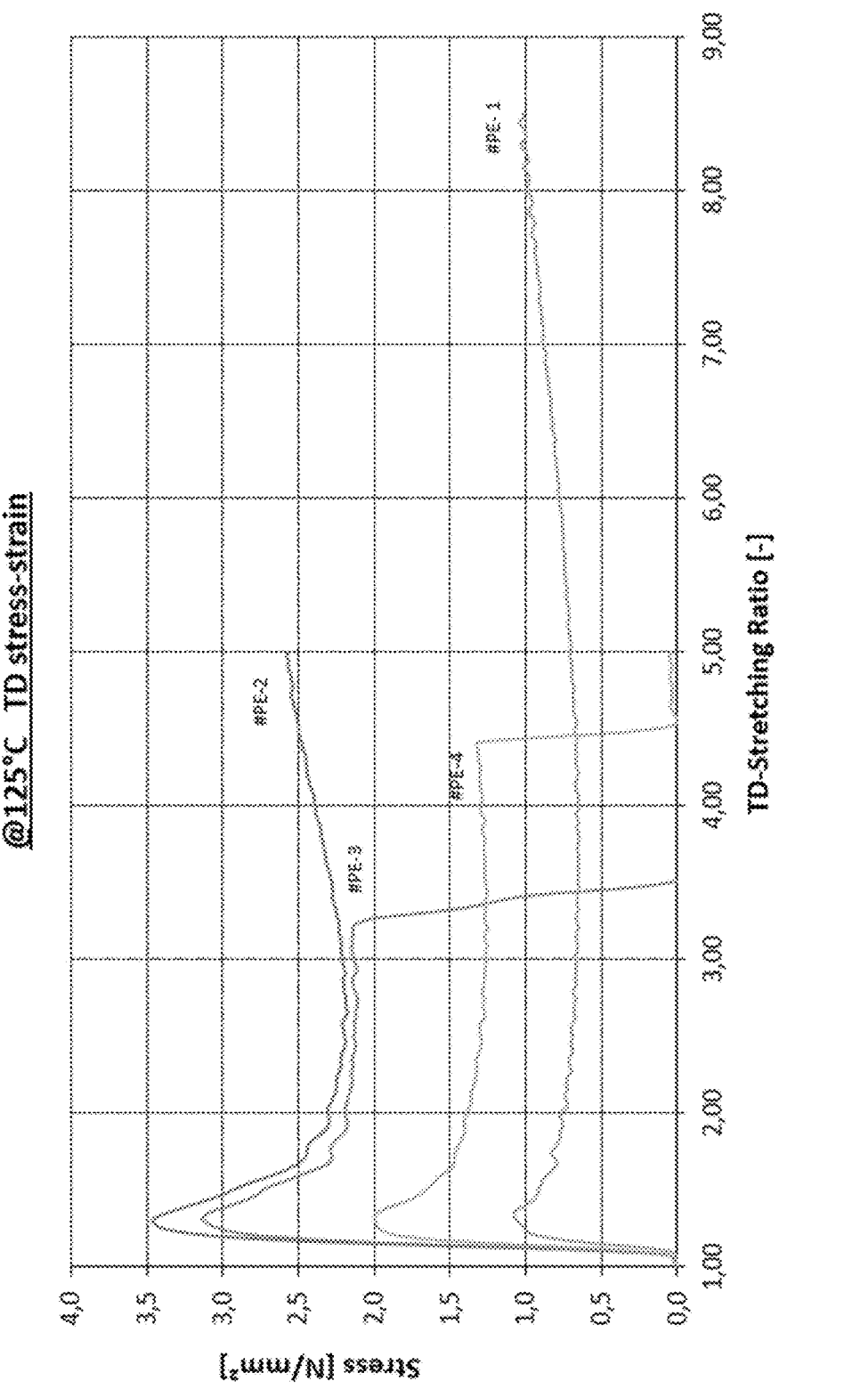
FIG. 2 shows stress-strain curves in transverse direction (TD).
Figure 3:
FIG. 3 is a photograph of EXAMPLE CE1 after stretching process.
Figure 4:
FIG. 4 is a photograph of EXAMPLE 1 after stretching process.
Figure 5:
FIG. 5 is a photograph of EXAMPLE 2 after stretching process.
Figure 6:
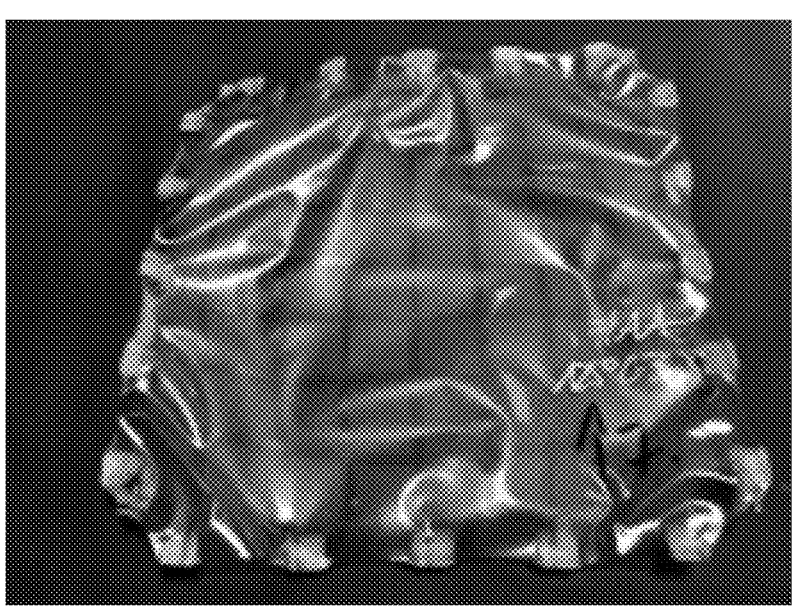
FIG. 6 is a photograph of EXAMPLE 3 after stretching process.
Figure 7A:
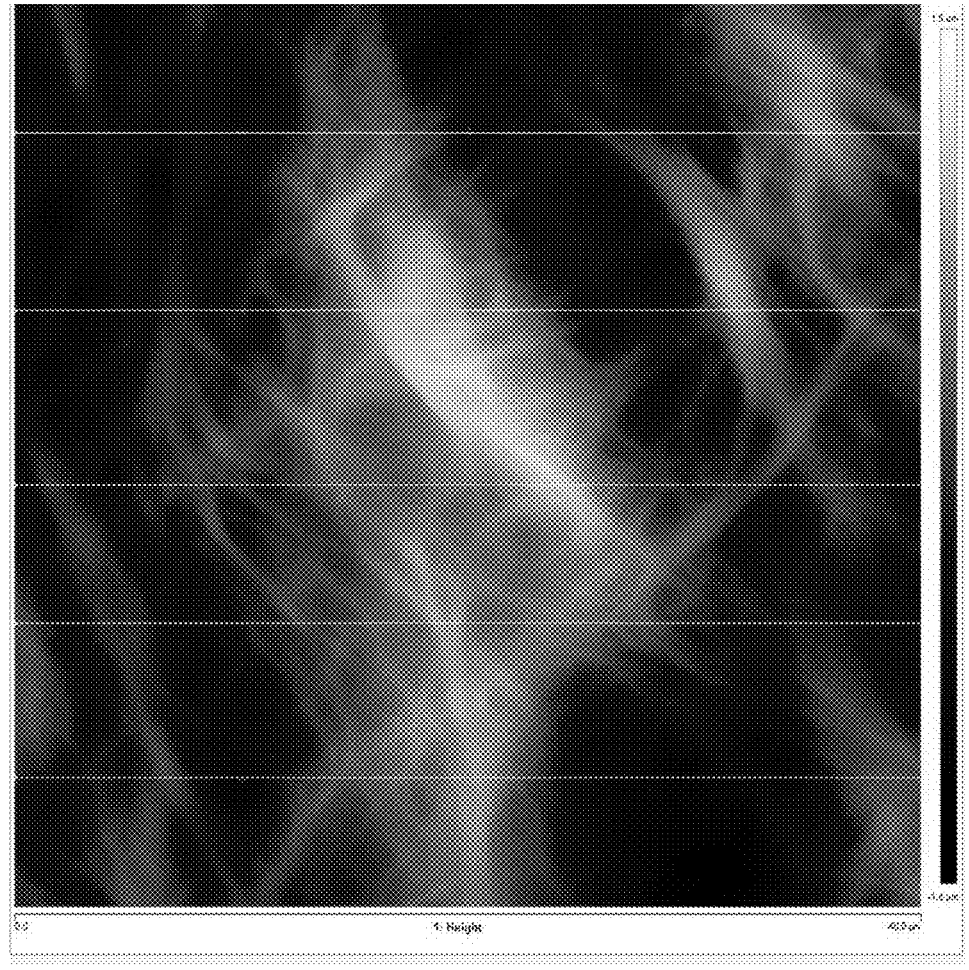
FIGS. 7A-C are a photograph and graphs to describe profile method to obtain Ra according to ISO 4287:1997.
Figure 7B:
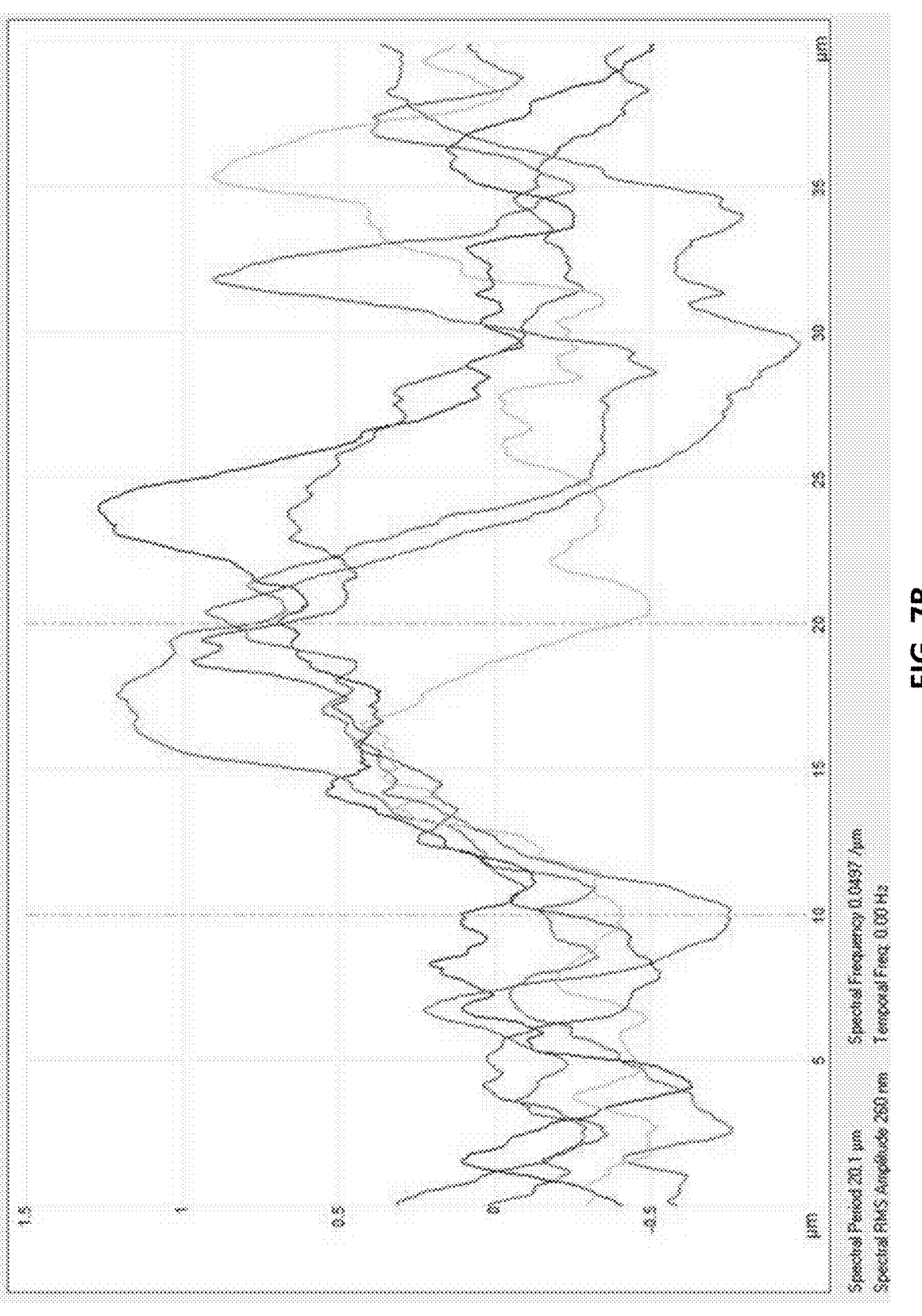
Figure 7C:
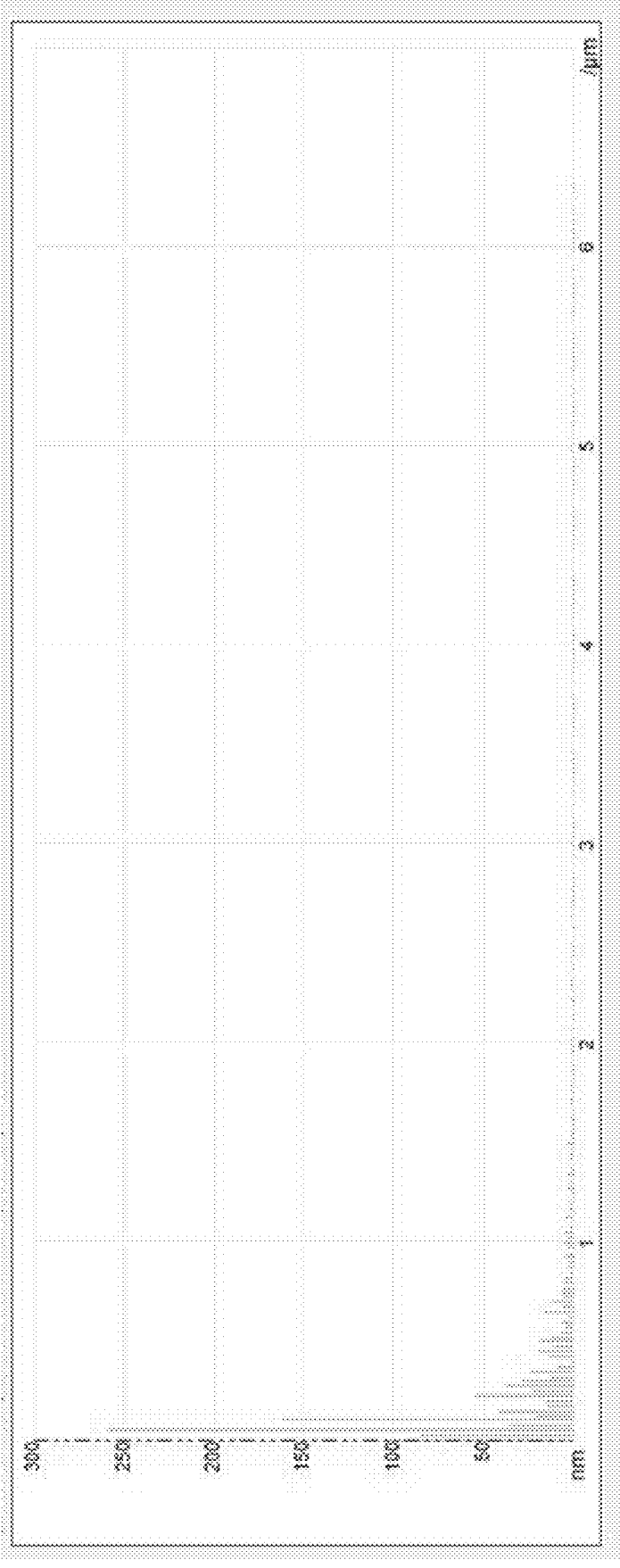

The profile TD stress strain curve shown in FIG. 2 shows that PE-1 and BF-1 presented good stretching capacity because they have better strain hardening, i.e., after yield strength the stress increases as the material stretches. Images of the films from PE-1 to PE-4 are shown in FIGS. 3-6, respectively.

Example 2

Films were produced on a 3 layer coextruder machine on an A/B/A structure, where A represents the skin layers with a 4 μm thickness and B represents the core layer. Some of the examples used a commercial LLDPE resin as secondary polymer (Braskem Proxess 3310). All extruders were fed as shown in Table 3 and the following machine settings:

Extruder temperature setting: 240° C., melt temperature 250° C., die temperature: 245° C., output: 30 kg/h.

MDO stretching ratio of the primary (cast) film, ratio was 1:5. Temperature profile: preheat: 70-130° C., stretch: 120° C.-80° C.; Annealing step at 75° C.

Transversal Orientation (TDO stretching) was done on a tenter frame line. Temperature profile: decreasing from 160° C. to 100° C. Stretch ratio TD: 1:7, line speed: 27 m/min.

The properties of the resulting films are also shown in Table 3.

TABLE 4

| Polymerization conditions of inventive examples 2 and 3 | | Inventive example 2 | Inventive example 3 |
|---|---|---|---|
| Catalyst condition | | | |
| Temperature Tubular | ° C. | 230 | 230 |
| Inlet temperature | ° C. | 110 | 110 |
| Outlet temperature | ° C. | 265 | 265 |
| Pressure | Kgf/cm$^2$ | >90 | >90 |
| H2 | ppm | 15 | 15 |
| Comonomer/C2 | wt % | 0.05 | 0.05 |
| Production rate | t/h | 25 | 25 |
| Tubular conversion | % | 50 | 50 |
| CSTR | | | |
| Agitator | | Stopped | Stopped |
| Outlet temperature | ° C. | 307 | 307 |
| Temperature trimmer | ° C. | 310 | 310 |
| CSTR conversion | % | 45 | 45 |
| Overall conversion | % | 95 | 96 |

TABLE 3

| | | Co extruded polymer (skin layers) | | | | | |
|---|---|---|---|---|---|---|---|
| | | PE-1(80 wt %) LLDPE (20 wt %) | PE-1 (100 wt %) | LLDPE (100 wt %) | BF-1 (75 wt %) LLDPE (25 wt %) | BF-1 (100 wt %) | BF-1 (100 wt %) |
| Core polymer (core layer) | | PE-1 (90 wt %) LLDPE (10 wt %) | PE-1 (100 wt %) | BF-1 (75 wt %) LLDPE (25 wt %) | BF-1 (75 wt %) LLDPE (25 wt %) | BF-1 (100 wt %) | BF-1 (100 wt %) |
| Run stability | | Very unstable | Did not run | Very stable | Very stable | Very stable | Very stable |
| Process | | Tenter frame | Tenter frame | Tenter frame | Tenter frame | Tenter frame | Blown film |
| Thickness | μm | 20 | 20 | 20 | 20 | 20 | 40 |
| Mechanical properties | | | | | | | |
| E-Modulus MD | MPa | 829 | N/A | 1053 | 1242 | 1359 | 896 |
| E-Modulus TD | MPa | 1034 | N/A | 1198 | 1417 | 1766 | 1250 |
| Optical properties | | | | | | | |
| Haze | % | 56.8 | N/A | 24.1 | 79.6 | 92.9 | 53 |
| Gloss 45° | G.U. | 12 | N/A | 49 | 9 | 5 | 17 |
| Ra | nm | 396 | N/A | 82 | 420 | 446 | N/A |

Example 3: Production of Ethylene-Based Copolymers

Catalyst Preparation

An inventive ethylene-based copolymer according to the present disclosure was prepared using a Ziegler-Natta catalyst comprising a Titanium compound and Vanadium compound.

The catalyst was activated with a reducing agent (DEAC), followed by a thermal treatment with warm cyclohexane (210-260° C.). Then, the catalyst is mixed with an alkyl agent (DEAL).

Ethylene Copolymer Polymerization

The polymerization was conducted in the presence of the catalyst above in a solutions polymerization process comprising a first tubular reactor and a second CSTR reactor. The catalyst was introduced into the tubular reactor at a rate of 2.5 kg/h, together with ethylene, hydrogen and 1-butene (comonomer). The polymerization conditions are summarized in Table 4.

TABLE 4-continued

| Polymerization conditions of inventive examples 2 and 3 | | Inventive example 2 | Inventive example 3 |
|---|---|---|---|
| Pressure | Kgf/cm$^2$ | >90 | >90 |
| Production rate | t/h | 25 | 25 |

The resulting ethylene-based copolymer had the following properties, shown in Table 5:

TABLE 5

| Properties | | Inventive example 2 | Inventive example 3 |
|---|---|---|---|
| MFR$_2$ | g/10 min | 1.6 | 1.8 |
| Density | kg/cm$^3$ | 952 | 953 |
| SEX | — | 1.37 | 1.34 |
| Comonomer Type | | 1-butene | 1-octene |
| Melting Point | ° C. | 129 | 131 |
| % Crystallinity | % | 71 | 75 |
| Melting Enthalpy (Hf) | J/g | 203 | 216 |
| Tc | ° C. | 116 | 117 |

TABLE 5-continued

| Properties | | Inventive example 2 | Inventive example 3 |
|---|---|---|---|
| Mn | g/mol | 10800 | 11683 |
| Mw | g/mol | 99000 | 103783 |
| Mz | g/mol | 361950 | 369766 |
| Mw/Mn | | 9.2 | 8.9 |
| Mz/Mw | | 3.7 | 3.6 |
| Mz/Mn | | 33.5 | 31.6 |

Example 4: Production of Films

Films were produced on a 3 layer coextruder machine on an A/B/A structure, where A represents the skin layers with a 4 μm thickness and B represents the core layer. Some of the examples used a commercial LLDPE resin as secondary polymer (Braskem Proxess 3310). All extruders were fed as shown in Table 5 and the following machine settings:

Extruder temperature setting: 240° C., melt temperature 250° C., die temperature: 245° C., output: 30 kg/h.

MDO stretching ratio of the primary (cast) film, ratio was 1:5. Temperature profile: preheat: 70-130° C., stretch: 120° C.-80° C.; Annealing step at 75° C.

Transversal Orientation (TDO stretching) was done on a tenter frame line. Temperature profile: decreasing from 160° C. to 100° C. Stretch ratio TD: 1:7, line speed: 27 m/min.

Figure 8A:
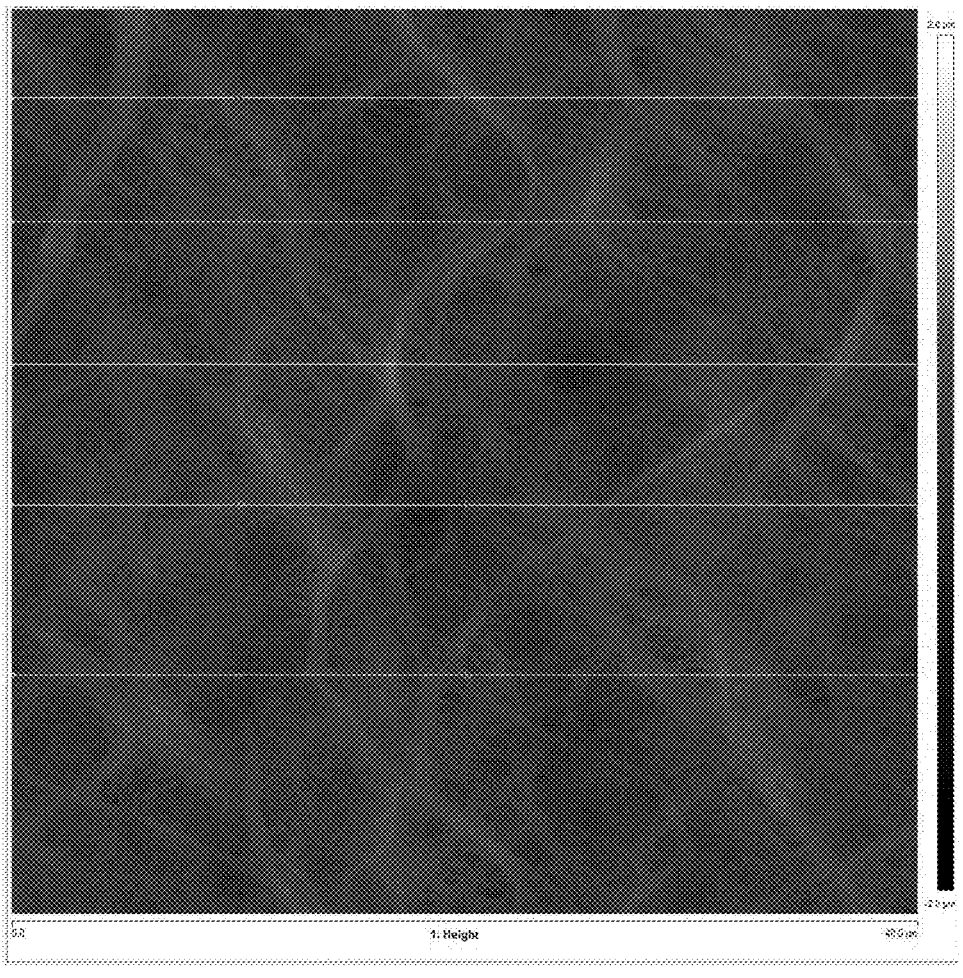
FIGS. 8A-C are a photograph and graphs of the biaxially oriented PE (BOPE) film (a) of Example 4 to obtain Ra according to ISO 4287:1997
Figure 8B:
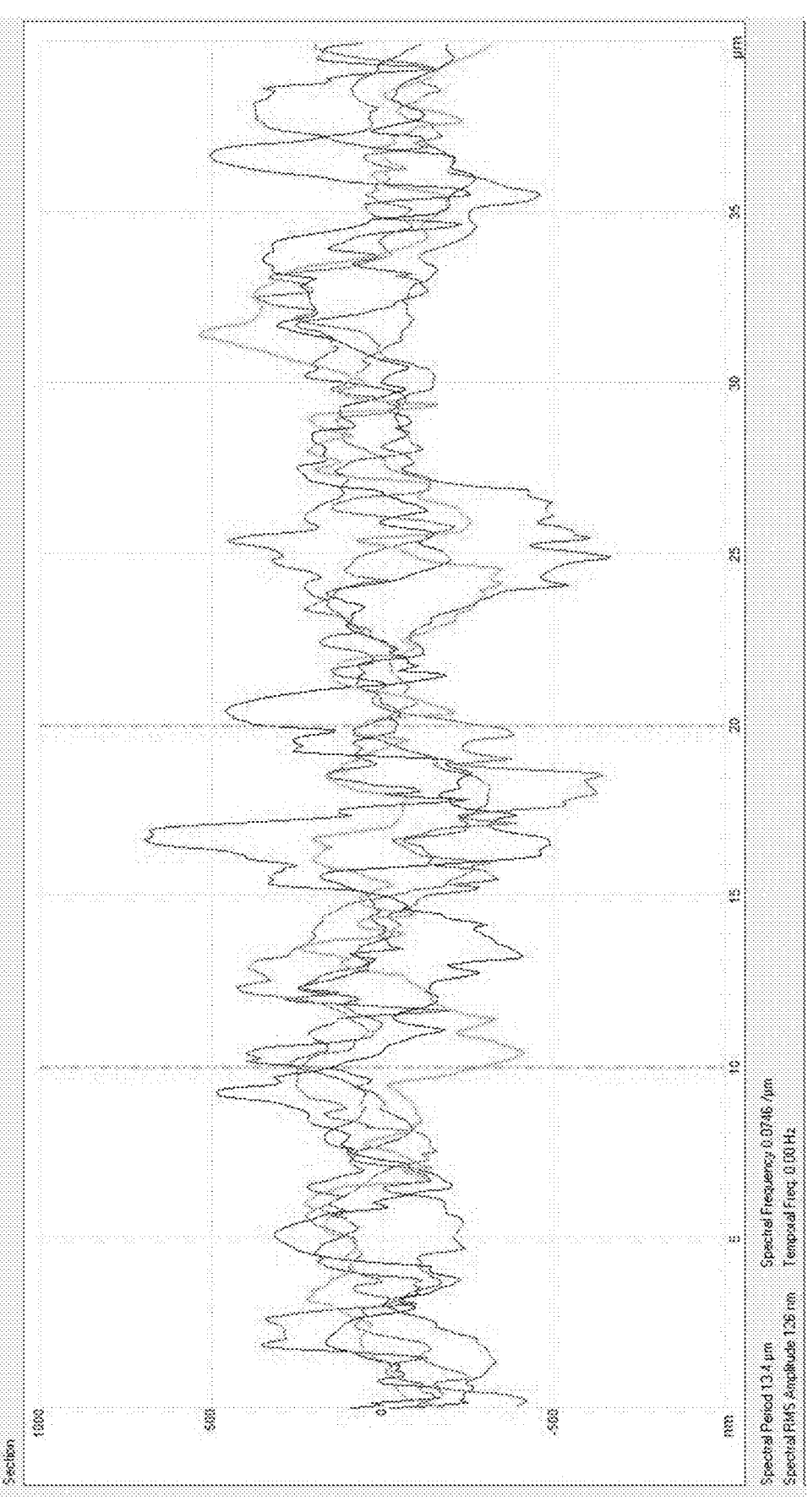
Figure 8C:
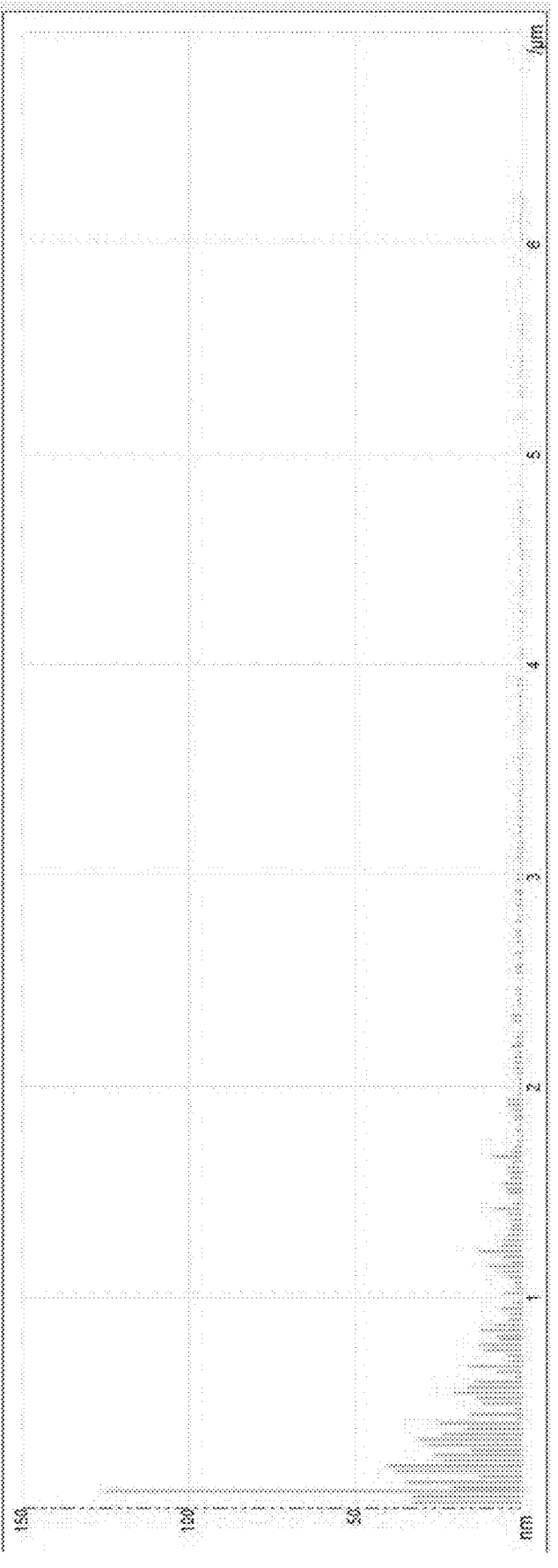
Figure 9A:
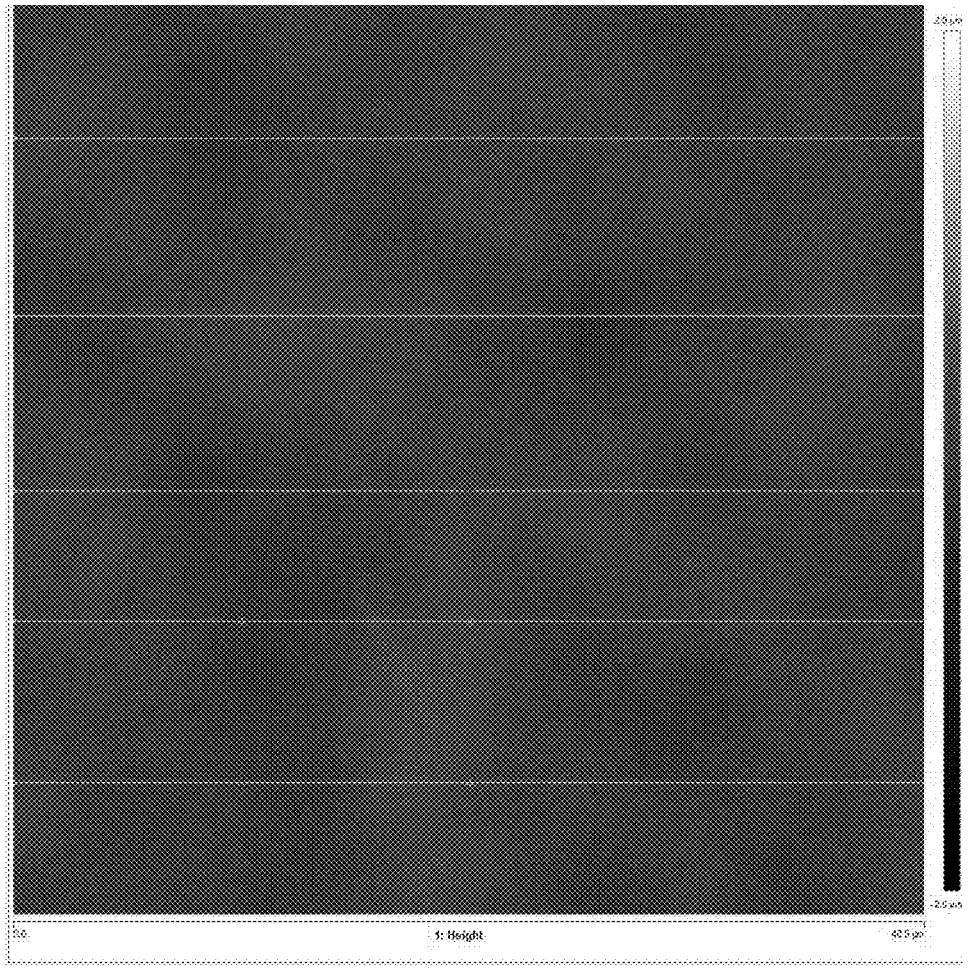
FIGS. 9A-C are a photograph and graphs of BOPE film (b) of Example 4 to obtain Ra according to ISO 4287:1997
Figure 9B:
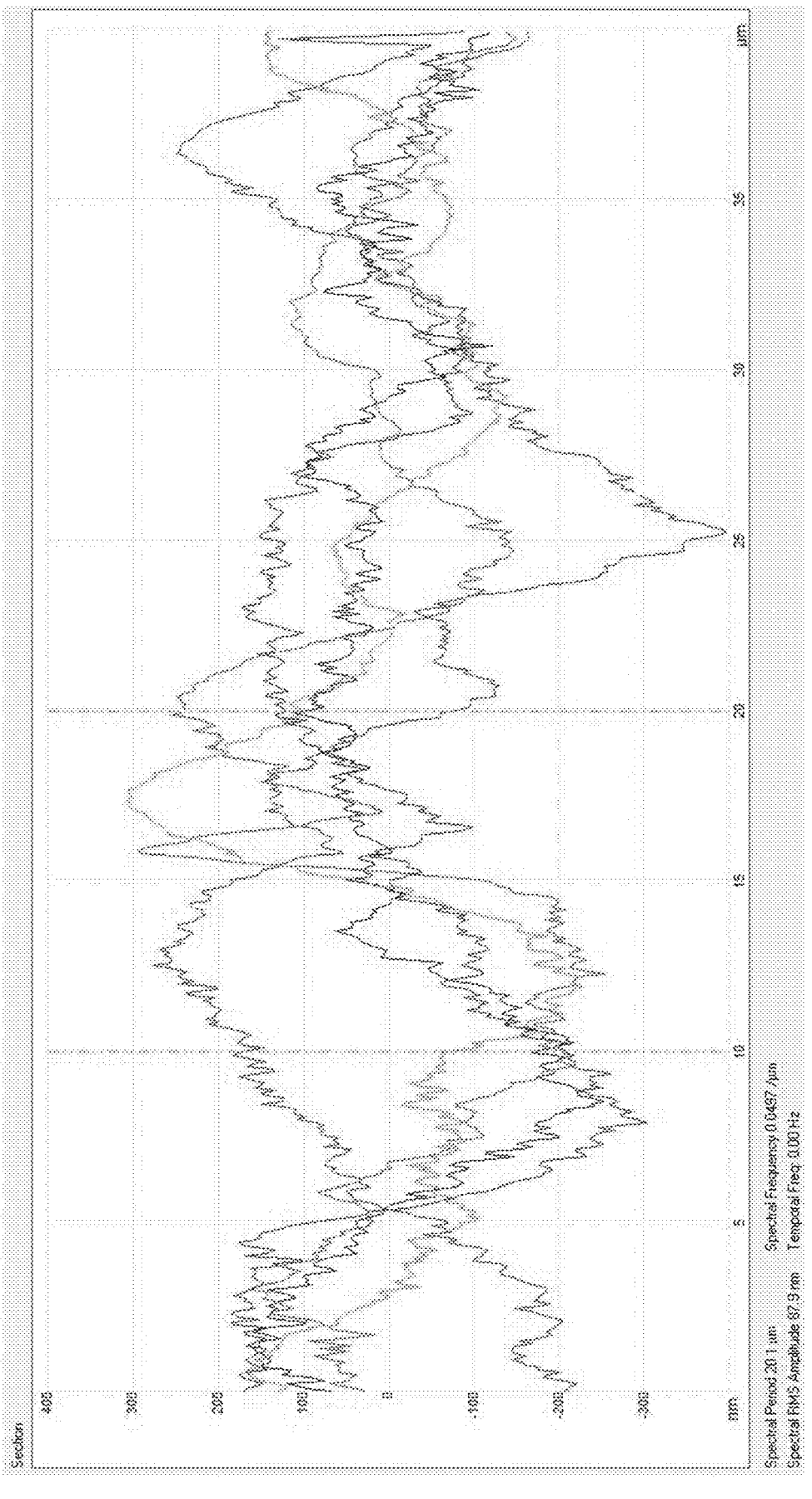
Figure 9C:
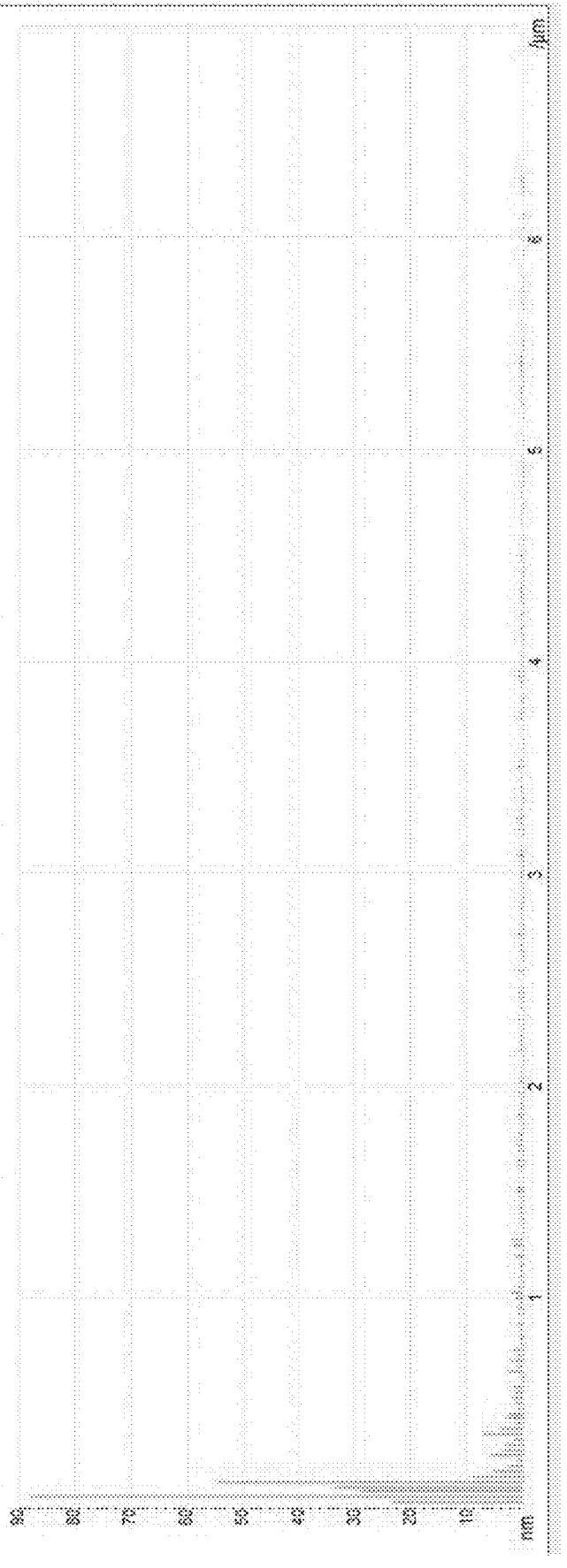

The properties of the resulting films are also shown in Table 6. FIGS. 8A-C correspond to BOPE film (a) and FIGS. 9A-C correspond of BOPE film (b), referenced in Table 6 below, to obtain Ra according to ISO 4287:1997.

TABLE 6

| | | Co extruded polymer (skin layers) | |
|---|---|---|---|
| | | Inventive example 2 (100 wt %) | LLDPE (100 wt %) |
| Core polymer (core layer) | | Inventive example 2 (100 wt %) | Inventive example 2 (100 wt %) |
| Run stability | | Very stable | Very stable |
| Process | | Tenter frame | Tenter frame |
| BOPE film | | (a) | (b) |
| Thickness | μm | 25 | 25 |
| Mechanical properties | | | |
| E-Modulus MD | MPa | 1461 | 1260 |
| E-Modulus TD | MPa | 1563 | 1635 |
| Optical properties | | | |
| Haze | % | 80.8 | 44 |
| Gloss 45° | G.U. | 8 | 28 |
| Ra | nm | 184 | 129 |

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed is:

1. A polyethylene-based composition comprising:
an ethylene-based copolymer produced from ethylene and one or more C3-C10 alpha olefin comonomers,
wherein the ethylene-based copolymer has:
a density ranging from 945 kg/m$^3$ to 961 kg/m$^3$ according to ASTM D792,
a melt flow rate (MFR$_2$) ranging from 0.5 g/10 min to 3.0 g/10 min according to ASTM D1238 at 190° C./2.16 kg,
a Z average molecular weight (Mz) ranging from 180,000 to 450,000 g/mol,
a molecular weight distribution (Mw/Mn) ranging from 5 to 25, and
a stress exponent ranging from 1.0 to 1.5.

2. The polyethylene-based composition of claim 1, wherein the ethylene-based copolymer is produced in the presence of a Ziegler-Natta catalyst.

3. The polyethylene-based composition of claim 2, wherein the catalyst is a Ziegler-Natta catalyst comprising a particulate support, titanium and optionally, vanadium.

4. The polyethylene-based composition of claim 1, wherein a content of the ethylene-based copolymer ranges from 1 wt % to 100 wt %, based on a total weight of the polyethylene-based composition.

5. The polyethylene-based composition of claim 1, wherein the ethylene-based copolymer has an ethylene content ranging from 90 mol % to 99.9 mol %, based on a total number of moles of the ethylene-based copolymer.

6. The polyethylene-based composition of claim 1, wherein the ethylene-based copolymer has a content of the one or more C3-C10 alpha olefin comonomers ranging from 0.1 mol % to 10 mol %, based on a total number of moles of the ethylene-based copolymer.

7. The polyethylene-based composition of claim 1, wherein the one or more C3-C10 alpha olefin comonomers is 1-butene and/or 1-octene.

8. The polyethylene-based composition of claim 1, further comprising at least one secondary polymer.

9. The polyethylene-based composition of claim 8, wherein the at least one secondary polymer is one or more selected from the group consisting of HDPE, MDPE, LLDPE, LDPE, ethylene-based elastomers, and ethylene-based plastomers.

10. The polyethylene-based composition of claim 8, wherein a content of the at least one secondary polymer ranges from 0.1 wt % to 50 wt %, based on a total weight of the polyethylene-based composition.

11. The polyethylene-based composition of claims 8, wherein the secondary polymer is selected from the group consisting of LLDPE, LDPE and combinations thereof.

12. The polyethylene-based composition of claim 1, wherein the ethylene-based copolymer has a weight average molecular weight (Mw) ranging from 80,000 to 120,000 g/mol.

13. The polyethylene-based composition of claim 1, wherein the ethylene-based copolymer has a number average molecular weight (Mn) ranging from 4,000 to 22,000 g/mol.

14. The polyethylene-based composition of claim 1, wherein the ethylene-based copolymer has a melt temperature (Tm), according to ASTM 3418, ranging from 110° C. to 140° C.

15. The polyethylene-based composition of claim 1, wherein the ethylene-based copolymer has a crystallization temperature (Tc), according to ASTM 3418, ranging from 65° C. to 125° C.

16. The polyethylene-based composition of claim 1, wherein the ethylene-based copolymer has a viscosity at 0.09 rad/s ranging from 3,000 to 25,000 Pa·s.

17. The polyethylene-based composition of claim 1, wherein the ethylene-based copolymer has a viscosity at 300 rad/s ranging from 100 to 2,000 Pa·s.

18. The polyethylene-based composition of claim 1, wherein the ethylene-based copolymer has a shear thinning index SHI5/200, being the ratio of the complex shear modulus at 5 kPa to the complex shear modulus at 200 kPa, of from 2 to 18.

19. The polyethylene-based composition of claim 1, wherein the ethylene-based copolymer has a shear thinning index SHI2.7/210, being the ratio of the complex shear modulus at 2.7 kPa to the complex shear modulus at 210 kPa, ranging from 2 to 26.

20. The polyethylene-based composition of claim 1, wherein the ethylene-based copolymer has an elasticity balance tan 0.09/tan 300, being the ratio of the loss tangent at 0.09 rad/s to the loss tangent at 300 rad/s, ranging from 1 to 26.

21. The polyethylene-based composition of claim 1, wherein the ethylene-based copolymer has a monomodal molecular weight distribution.

22. An article comprising the polyethylene-based composition of claim 1.

23. The article of claim 22, wherein the article is a blown film, a cast film, a mono-oriented film or a biaxially oriented film.

24. A biaxially oriented film, comprising:

the polyethylene-based composition of claim 1.

25. The biaxially oriented film of claim 24, wherein the polyethylene-based composition further comprises a secondary polymer.

26. The biaxially oriented film of claim 24, which is a multilayer film, the multilayer film comprising at least one layer of film comprising the polyethylene-based composition.

27. The biaxially oriented film of claim 26, wherein the multilayer film further comprises at least one layer of film comprising at least one secondary polymer.

28. The biaxially oriented film of claim 26, wherein the multilayer film comprises the at least one layer of film comprising at least one secondary polymer selected from the group consisting of HDPE, MDPE, LLDPE, LDPE, ethylene-based elastomers, and ethylene-based plastomers.

29. The biaxially oriented film of claim 25, wherein the secondary polymer is selected from the group consisting of LLDPE, LDPE and combinations thereof.

30. The biaxially oriented film of claim 24 having a tensile modulus of 1000 MPa or higher, according to ASTM D882, in a machine direction of the biaxially oriented film.

31. The biaxially oriented film of claim 24 having a tensile modulus of 1000 MPa or higher, according to ASTM D882, in a transverse direction of the biaxially oriented film.

32. The biaxially oriented film of claim 24 having a haze of 95% or lower, according to ASTM 1003D, when a thickness of the biaxially oriented film is 20 μm.

33. The biaxially oriented film of claim 24 having a gloss at 45° of 5 g.u. or higher, according to ASTM D2457.

34. The biaxially oriented film of claim 24 having a roughness Ra ranging from 20 nm to 500 nm, according to ISO 4287:1997 measured by Atomic Force Microscopy.

35. The biaxially oriented film of claim 24, wherein the biaxially oriented film is produced by a tenter frame process.

36. A method of forming a biaxially oriented film, comprising:

extruding at least one layer of the polyethylene-based composition of claim 1 to form a film.

37. The polyethylene-based composition of claim 1, wherein the ethylene-based copolymer has the stress exponent ranging from 1.0 to 1.37.

* * * * *